US012664919B2

(12) United States Patent
Robertson et al.

(10) Patent No.: US 12,664,919 B2
(45) Date of Patent: Jun. 23, 2026

(54) ADJUSTING PERFORMANCE OF PARALLEL AUGMENTED REALITY EXPERIENCES

(71) Applicant: Snap Inc., Santa Monica, CA (US)

(72) Inventors: John James Robertson, Los Angeles, CA (US); Dheeresh Pratap Mathur, San Diego, CA (US); Rishabh Bhatnagar, San Diego, CA (US); Richard Zhuang, San Diego, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/815,709

(22) Filed: Aug. 26, 2024

(65) Prior Publication Data

US 2026/0057812 A1 Feb. 26, 2026

(51) Int. Cl.
*G09G 3/00* (2006.01)

(52) U.S. Cl.
CPC ....... *G09G 3/001* (2013.01); *G09G 2330/045* (2013.01); *G09G 2340/0435* (2013.01)

(58) Field of Classification Search
CPC ............. G09G 3/001; G09G 2330/045; G09G 2340/0435; G06F 3/011
See application file for complete search history.

(56) References Cited

U.S. PATENT DOCUMENTS

2018/0267839 A1* 9/2018 Maisuria ............... G06F 1/3228
2019/0033947 A1 1/2019 Chan et al.
2020/0125176 A1 4/2020 Chou et al.
2023/0350570 A1* 11/2023 Bhatnagar ............... H04L 43/16
2024/0096033 A1* 3/2024 McCracken ............ G06F 3/167

FOREIGN PATENT DOCUMENTS

EP 4386519 A1 6/2024

OTHER PUBLICATIONS

"Cgroups", Wikipedia, [Online]. Retrieved from the Internet: <URL: https://web.archive.org/web/20240815163238/https://en.wikipedia.org/wiki/Cgroups>, (Archived on Aug. 15, 2024), 7 pgs.
"Extending the Kernel with eBPF", [Online]. Retrieved from the Internet: <URL: https://web.archive.org/web/20240811024223/https://source.android.com/docs/core/architecture/kernel/bpf>, (Archived on Aug. 11, 2024), 8 pgs.
"International Application Serial No. PCT/US2025/043375, International Search Report mailed Nov. 11, 2025", 4 pgs.

(Continued)

*Primary Examiner* — Hang Lin
(74) *Attorney, Agent, or Firm* — Schwegman Lundberg & Woessner, P.A.

(57) ABSTRACT

Systems, methods, and computer readable media for power and temperature attribution on mobile devices. Example methods include launching a native augmented reality (AR) application together with an external AR application on the user system. The example methods include determining that usage of the external AR application transgresses a usage budget for the external AR application and adjusting one or more operations of the external AR application without modifying operation of the native AR application in response to determining that the usage of the external AR application transgresses the usage budget for the external AR application.

20 Claims, 12 Drawing Sheets

(56) References Cited

OTHER PUBLICATIONS

"International Application Serial No. PCT/US2025/043375, Written Opinion mailed Nov. 11, 2025", 6 pgs.
"Non-negative least squares", Wikipedia, [Online]. Retrieved from the Internet: <URL: https://web.archive.org/web/20240805011122/https://en.wikipedia.org/wiki/Non-negative_least squares>, (Archived on Aug. 5, 2024), 4 pgs.
Brocanelli, Marco, et al., "Supervisory Performance Control of Concurrent Mobile Apps for Energy Efficiency", IEEE Transactions on Mobile Computing, vol. 19, No. 3, (Mar. 2020), 740-751.
Schmoll, Robert-Steve, et al., "Demonstration of VR / AR offloading to Mobile Edge Cloud for low latency 5G gaming application", 2018 15th IEEE Annual Consumer Communications & Networking Conference (CCNC), (Jan. 12, 2018), 3 pgs.

* cited by examiner

ADJUSTING PERFORMANCE OF PARALLEL AUGMENTED REALITY EXPERIENCES

TECHNICAL FIELD

Examples of the present disclosure relate generally to power attribution and throttling on mobile devices. More particularly, but not by way of limitation, examples of the present disclosure relate to a mobile device, such as a virtual reality (VR), mixed reality (MR), or an augmented reality (AR) mobile device where the VR, MR, or AR mobile device attributes power consumption and temperature generation to processes and throttles processes that exceed their power consumption or temperature generation budget.

BACKGROUND

Users increasingly want mobile devices to operate in a more user-friendly manner with more functions. However, often, the mobile devices are susceptible to overheating and often the mobile devices have limited batteries to provide additional functions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
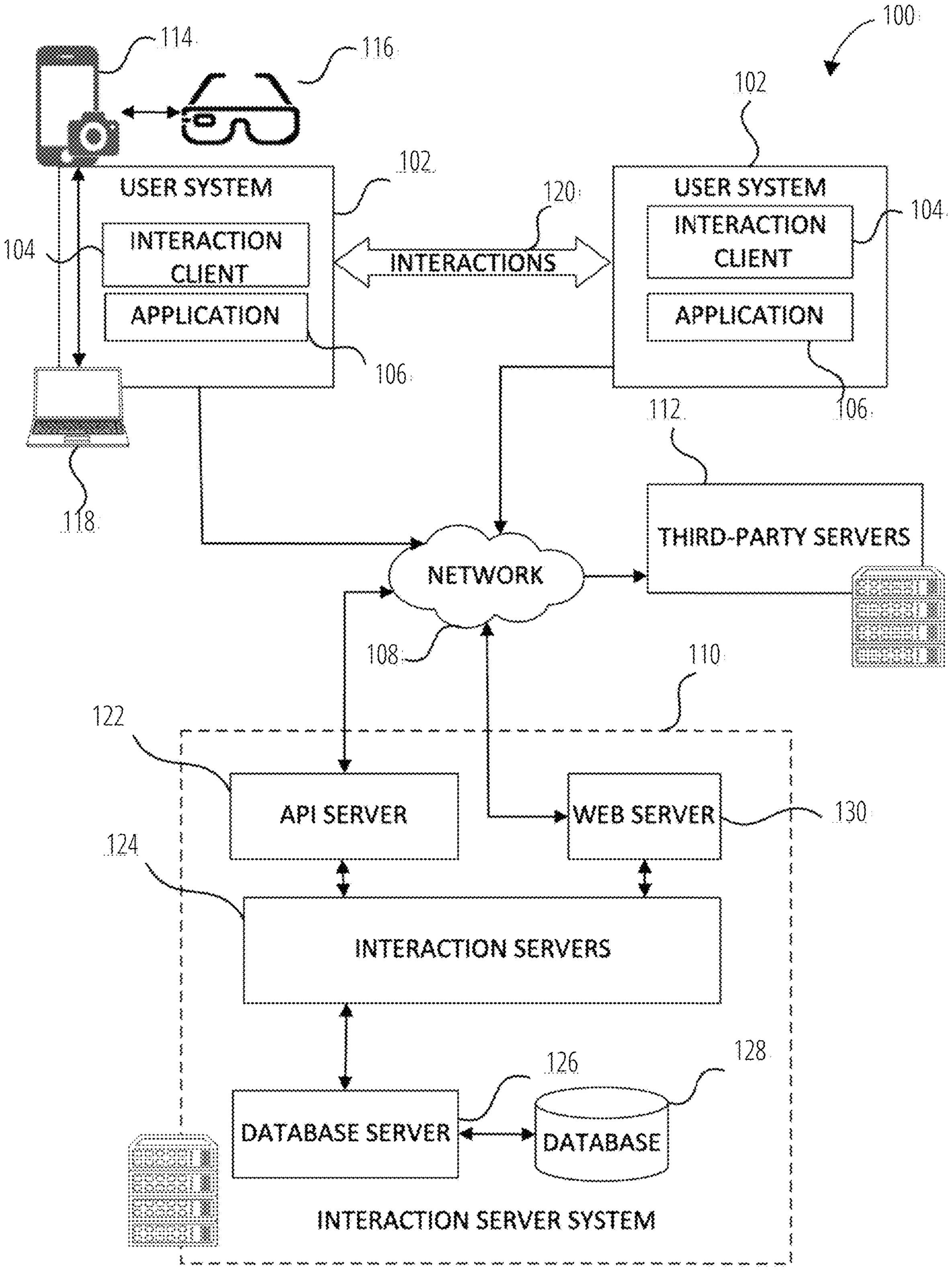
FIG. 1 is a diagrammatic representation of a networked environment in which the present disclosure may be deployed, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

The term mobile device is used as an illustrative device; however, one skilled in the art will recognize that the methods, systems, and computer readable medium disclosed herein are applicable to other mobile devices such as wearable devices or non-wearable devices including AR, VR and MR head-wearable devices.

Augmented reality (AR) applications have become increasingly prevalent across various industries, offering innovative solutions for visualization, training, and interactive experiences. As the demand for AR technology grows, organizations face challenges in efficiently scaling their AR operations to meet user needs. A common approach has been to scale all AR operations equally when usage exceeds certain thresholds or to scale certain AR operations. However, this uniform scaling strategy often leads to significant waste of resources and operational inefficiencies and the selection of which AR operations to scale is challenging.

The equal scaling of all AR operations, regardless of their individual requirements and usage patterns, results in suboptimal resource allocation. Some AR features may require more computational power or network bandwidth than others, yet receive the same level of scaling. This mismatch between resource allocation and actual needs leads to underutilization of resources for less demanding operations while potentially leaving high-demand features under-supported. Additionally, the uniform scaling approach fails to account for variations in user behavior and preferences, potentially allocating resources to rarely used features at the expense of more popular ones. Furthermore, the indiscriminate scaling of AR operations can lead to increased costs without proportional improvements in performance or user experience. Organizations may find themselves investing in unnecessary infrastructure upgrades or cloud resources to support the blanket scaling approach, resulting in financial inefficiencies. This wasteful allocation of resources not only impacts the bottom line but also hinders the ability to invest in targeted improvements that could significantly enhance the overall AR experience.

The inefficiencies encountered in scaling AR operations equally also extend to maintenance and management complexities. As all components of the AR system grow at the same rate, the overall system becomes more challenging to monitor, update, and optimize. This increased complexity can lead to longer downtimes during maintenance, reduced agility in responding to changing user needs, and difficulties in identifying and resolving performance bottlenecks.

While individualized scaling of AR operations offers potential benefits in addressing resource waste and inefficiencies, it introduces its own set of challenges, particularly in selecting which AR operations to scale. The complexity of AR systems, with their diverse features and interconnected components, makes it difficult to determine which operations should receive priority in scaling efforts. Selecting specific AR operations for scaling requires a deep understanding of system architecture, user behavior patterns, and resource utilization across different features. This level of analysis can be time-consuming and resource-intensive, potentially offsetting the efficiency gains sought through individualized scaling. Moreover, the dynamic nature of AR applications means that usage patterns and resource requirements may change rapidly, necessitating frequent reassessment of scaling decisions. Another challenge in selecting AR operations for individualized scaling lies in predicting the impact of scaling decisions on overall system performance and user experience. Scaling certain operations while leaving others unchanged may lead to imbalances in the system, potentially creating bottlenecks or degrading the performance of interdependent features. This complexity makes it challenging to optimize resource allocation without inadvertently compromising other aspects of the AR experience.

The scaling of the operating system's AR application in conjunction with other running AR services can lead to system instability and user experience issues, particularly when resource demands exceed system capabilities. When multiple AR applications and services are scaled simultaneously, they compete for limited system resources such as CPU, GPU, and memory. This competition can result in resource contention, leading to system-wide performance degradation. In severe cases, this overallocation of resources can cause the entire system to become unresponsive or "hang." This situation is particularly problematic in AR environments, where real-time processing and rendering are used for maintaining a seamless user experience. When the system hangs, users may find themselves unable to exit problematic AR applications through normal means, as the system's AR application (referred to as the native AR application) input handling and user interface become unresponsive.

The disclosed techniques address these and other challenges by providing a system that dynamically scales operations performed by multiple AR applications. Particularly, the disclosed techniques launch a native AR application, on a user system, together with an external AR application on the same user system. The disclosed techniques determine that usage of the external AR application transgresses a usage budget for the external AR application and, in response, adjust one or more operations of the external AR application without modifying operation of the native AR application. This ensures that the underlying operation of the operating system AR application continues to be available with the same quality of service (QoS) even though one or more external AR applications (or experiences) are exceeding usage thresholds.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user system 102), an interaction server system 110 and third-party servers 112). An interaction client 104 can also communicate with locally hosted applications 106 using Applications Program Interfaces (APIs).

Each user system 102 may include multiple user devices, such as a computing device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems (and, for example, interaction clients 104 and other applications 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104). The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the applications 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed applications 106. In some cases, applications 106 that are locally installed on the user system 102 can be launched independently of and separately from the interaction client 104, such as by selecting an icon corresponding to the applications 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party servers 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the applications 106 (or applets) can vary based on how the menu is launched by the user (e.g., from a conversation interface or from a non-conversation interface).

System Architecture

Figure 2:
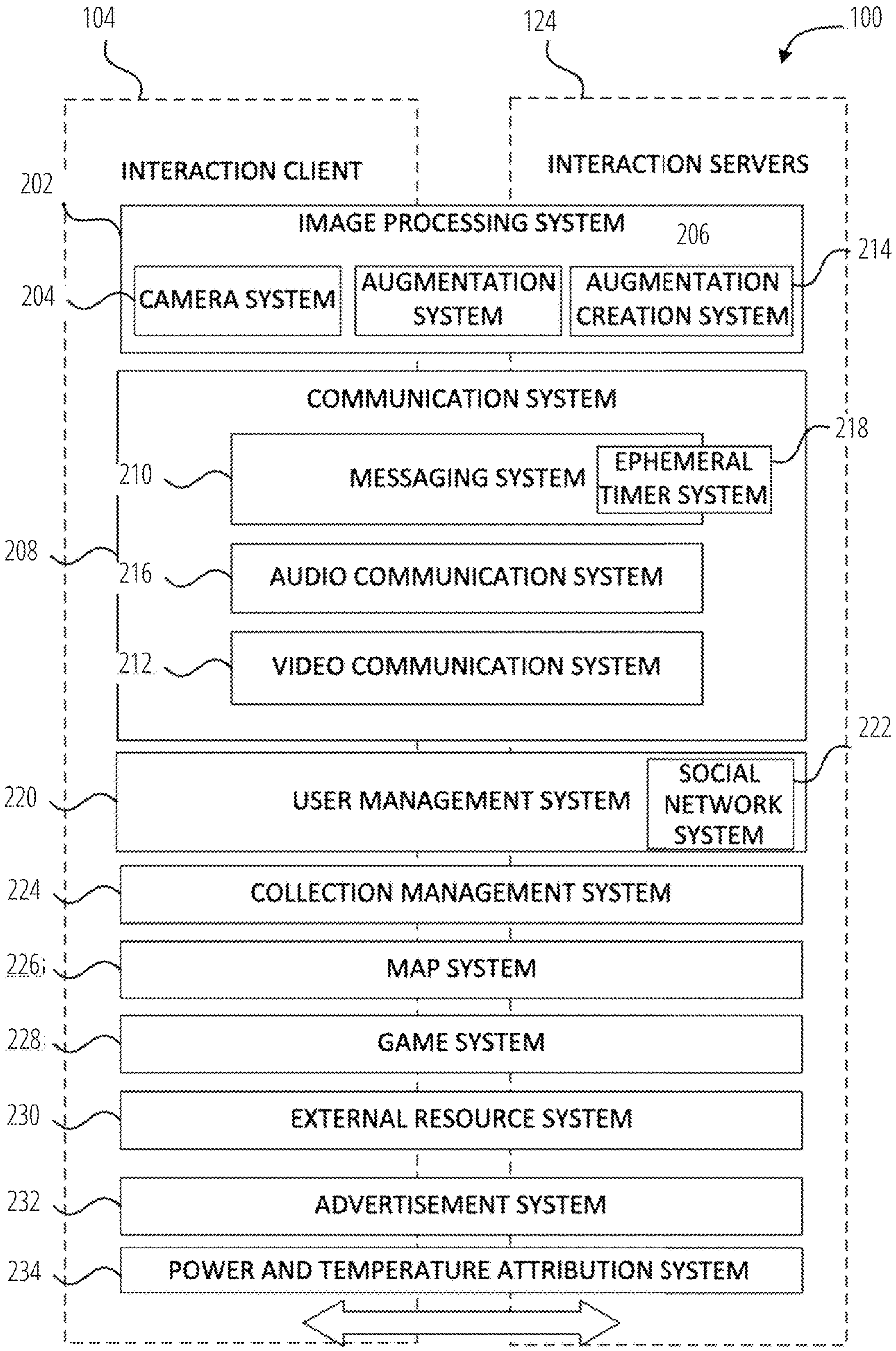
FIG. 2 is a diagrammatic representation of a messaging system, according to some examples, that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1002 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 232 operationally enables the purchasing of advertisements by third parties for presentation to end-users via the interaction clients 104 and also handles the delivery and presentation of these advertisements.

The power and temperature attribution system 234 supports system 601 (discussed below) for power and temperature attribution on mobile devices. In one example, the power and temperature system 234 maintains power consumption 702 and temperature generation 705 information for different resources 701 of the system 601. The system 601 accesses the information via the wireless module 604, in accordance with some examples. The power and temperature attribution system 234 may act as an intermediary for sending data between the computing device 114 and the head-wearable apparatus 116 where the system 601 is part of the head-wearable apparatus 116. In some examples, the power and temperature attribution system 234 performs one or more functions described in conjunction with the system 601.

Data Architecture

Figure 3:
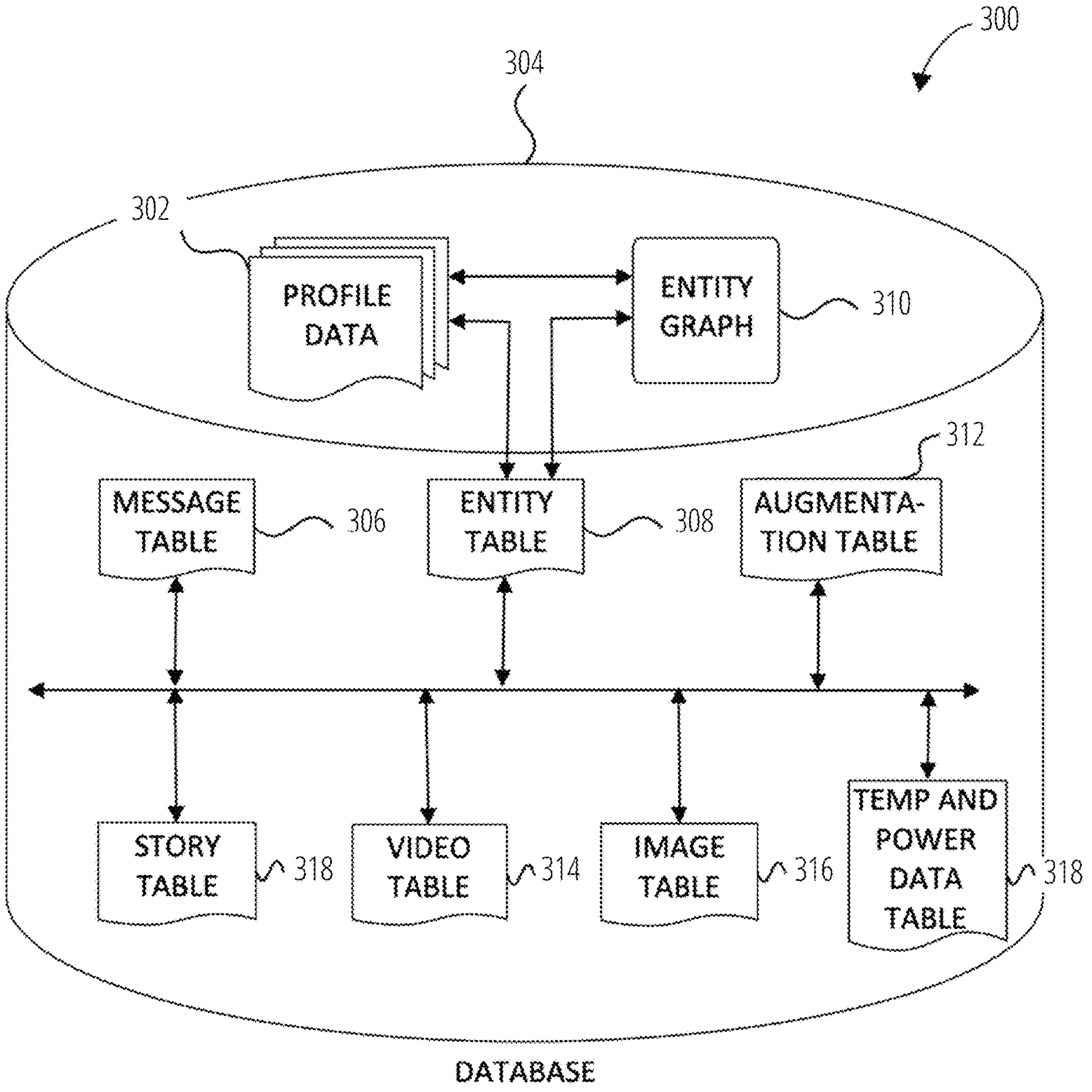
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The databases 304 also includes temperature (temp) and power data table 318. The temperature and power data table 318 includes, referring to FIG. 6 and FIG. 7, applications 617, 629, power consumption 702, and temperature generation 705 information for different resources 701 of the system 601.

Data Communications Architecture

Figure 4:
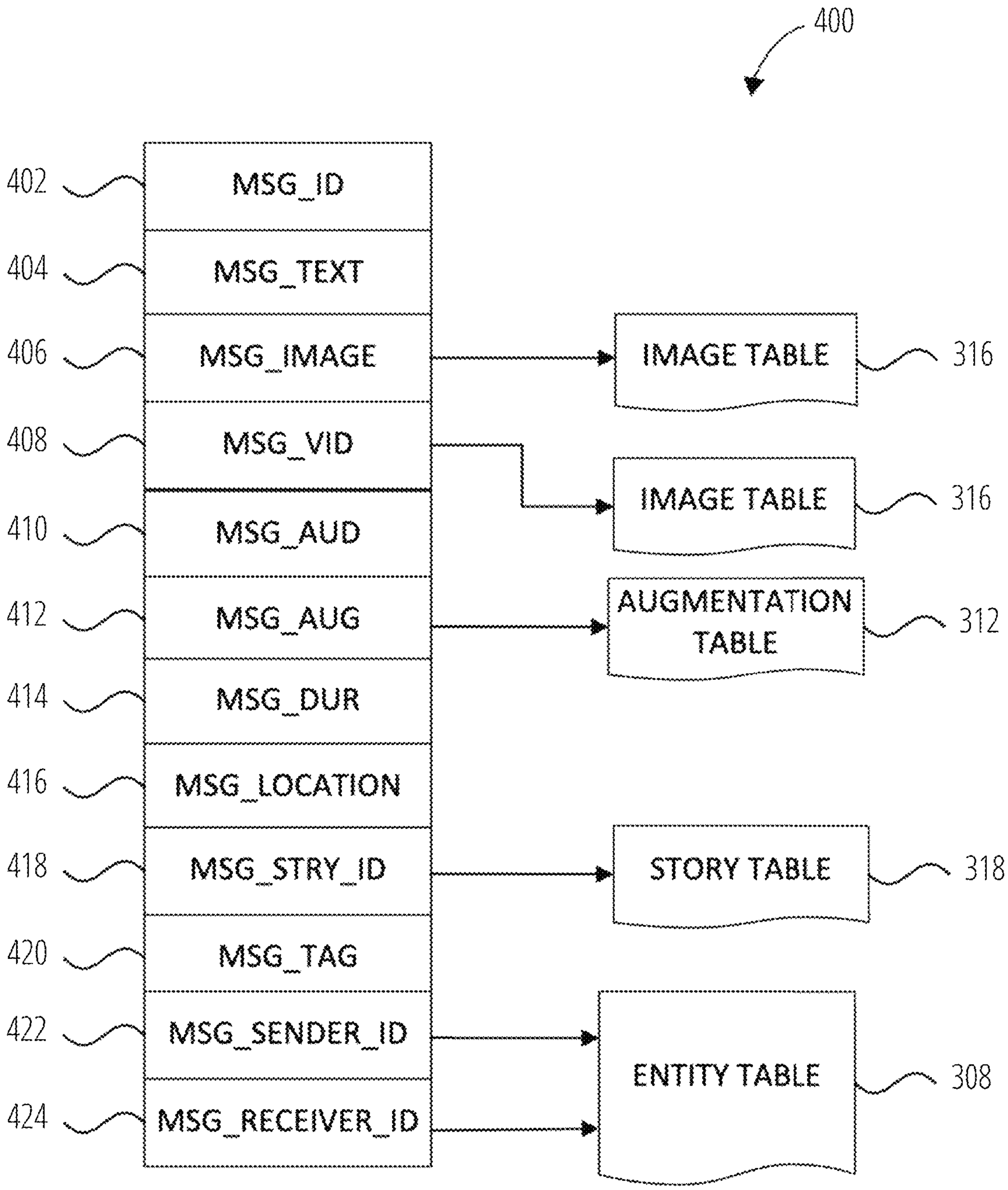
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402 is a unique identifier that identifies the message 400.
- Message text payload 404 is text, to be generated by a user via a user interface of the user system 102, and that is included in the message 400.
- Message image payload 406 is image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to Message image payload 406, message video payload 408, or message audio payload 410 of the message 400. Augmentation data for a sent or received message 400 may be stored in the augmentation table 312.
- Message duration parameter 414 is a parameter value indicating, in seconds, the amount of time for which content of the message (e.g., the Message image payload 406, message video payload 408, message audio payload 410) is to be presented or made accessible to a user via the interaction client 104.
- Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the Message image payload 406, or a specific video in the message video payload 408).
- Message story identifier 418: identifier values identifying one or more content collections (e.g., "stories" identified in the story table 318) with which a particular content item in the Message image payload 406 of the message 400 is associated. For example, multiple images within the Message image payload 406 may each be associated with multiple content collections using identifier values.
- Message tag 420: each message 400 may be tagged with multiple tags, each of which is indicative of the subject matter of content included in the message payload. For example, where a particular image included in the Message image payload 406 depicts an animal (e.g., a lion), a tag value may be included within the message tag 420 that is indicative of the relevant animal. Tag values may be generated manually, based on user input, or may be automatically generated using, for example, image recognition.
- Message sender identifier 422: an identifier (e.g., a messaging system identifier, email address, or device identifier) indicative of a user of the user system 102 on which the message 400 was generated and from which the message 400 was sent.
- Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the Message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Figure 5:
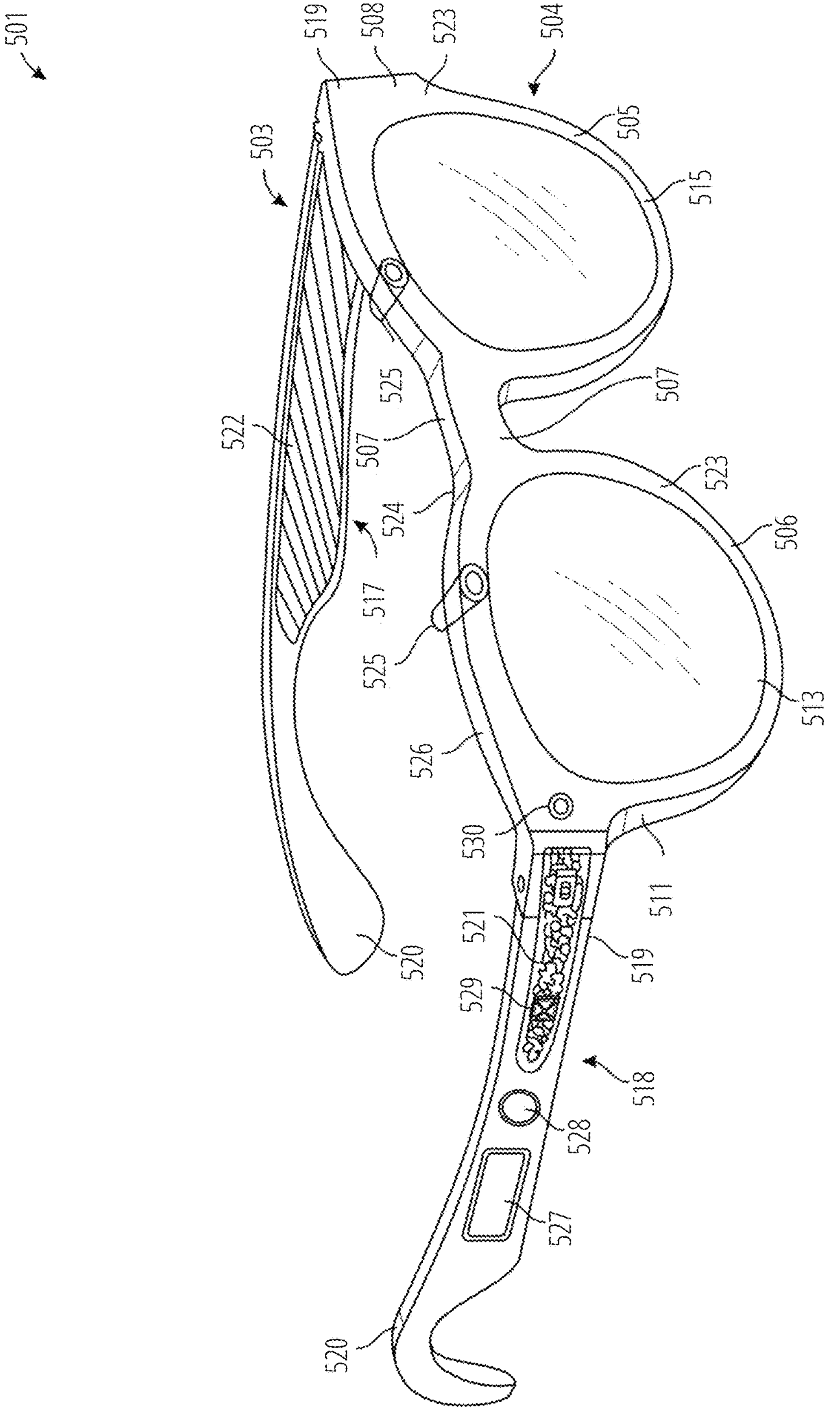
FIG. 5 is a perspective view of a head-wearable apparatus in the form of glasses, in accordance with some examples.

FIG. 5 is a perspective view of a head-wearable apparatus in the form of glasses 501, in accordance with some examples. The glasses 501 are an article of eyewear including electronics, which operate within a network system for communicating image and video content. FIG. 5 illustrates an example of the head-wearable apparatus 116. In some examples, the wearable electronic device is termed AR glasses. The glasses 501 can include a frame 503 made from any suitable material such as plastic or metal, including any suitable shape memory alloy. The frame 503 can have a front piece 504 that can include a first or left lens, display, or optical element holder 505 and a second or right lens, display, or optical element holder 506 connected by a bridge 507. The front piece 504 additionally includes a left end portion 508 and a right end portion 511. A first or left optical element 515 and a second or right optical element 513 can be provided within respective left and right optical element holders 505, 506. Each of the optical elements 514, 515 can be a lens, a display, a display assembly, or a combination of the foregoing. In some examples, for example, the glasses 501 are provided with an integrated near-eye display mechanism that enables, for example, display to the user of preview images for visual media captured by cameras 525 of the glasses 501.

The frame 503 additionally includes a left arm or temple piece 517 and a right arm or temple piece 518 coupled to the respective left and right end portions 509, 511 of the front piece 504 by any suitable means such as a hinge (not shown), so as to be coupled to the front piece 504, or rigidly or fixedly secured to the front piece 504 so as to be integral with the front piece 504. Each of the temple pieces 517 and 518 can include a first portion 519 that is coupled to the respective end portion 510 or 511 of the front piece 504 and any suitable second portion 520, such as a curved or arcuate piece, for coupling to the car of the user. In one example, the front piece 504 can be formed from a single piece of material, so as to have a unitary or integral construction. In one example, the entire frame 503 can be formed from a single piece of material so as to have a unitary or integral construction.

The glasses 501 include a computing device, such as a computer 521, which can be of any suitable type so as to be carried by the frame 503 and, in one example, of a suitable size and shape, so as to be at least partially disposed in one or more of the temple pieces 517 and 518. In one example, the computer 521 has a size and shape similar to the size and shape of one of the temple pieces 517, 518 and is thus disposed almost entirely if not entirely within the structure and confines of such temple pieces 517 and 518.

In one example, the computer 521 can be disposed in both of the temple pieces 517, 518. The computer 521 can include one or more processors with memory, wireless communication circuitry, and a power source. The computer 521 comprises low-power circuitry, high-speed circuitry, location circuitry, and a display processor. Various other examples may include these elements in different configurations or integrated together in different ways. Additional details of aspects of the computer 521 may be implemented as described with reference to the description that follows.

The computer 521 additionally includes a battery 522 or other suitable portable power supply. In one example, the battery 522 is disposed in one of the temple pieces 517 or 518. In the glasses 501 shown in FIG. 5, the battery 522 is shown as being disposed in the left temple piece 517 and electrically coupled using a connection 526 to the remainder of the computer 521 disposed in the right temple piece 518. One or more input and output devices can include a connector or port (not shown) suitable for charging a battery 522 accessible from the outside of the frame 503, a wireless receiver, transmitter, or transceiver (not shown), or a combination of such devices.

The glasses 501 include digital cameras 525. Although two cameras 525 are depicted, other examples contemplate the use of a single or additional (i.e., more than two) cameras 525. For ease of description, various features relating to the cameras 525 will be described further with reference to only a single camera 525, but it will be appreciated that these features can apply, in suitable examples, to both cameras 525.

In various examples, the glasses 501 may include any number of input sensors or peripheral devices in addition to the cameras 525. The front piece 504 is provided with an outward-facing, forward-facing, front, or outer surface 523 that faces forward or away from the user when the glasses 501 are mounted on the face of the user, and an opposite inward-facing, rearward-facing, rear, or inner surface 524 that faces the face of the user when the glasses 501 are mounted on the face of the user. Such sensors can include inward-facing video sensors or digital imaging modules such as cameras 525 that can be mounted on or provided within the inner surface 524 of the front piece 504 or elsewhere on the frame 503 so as to be facing the user, and outward-facing video sensors or digital imaging modules such as the cameras 525 that can be mounted on or provided with the outer surface 523 of the front piece 504 or elsewhere on the frame 503 so as to be facing away from the user. Such sensors, peripheral devices, or peripherals can additionally include biometric sensors, location sensors, accelerometers, or any other such sensors. In some examples, projectors (not illustrated) are used to project images on the inner surface of the optical elements 514, 515 (or lenses) to provide a mixed reality or augmented reality experience for the user of the glasses 501.

The glasses 501 further include an example of a camera control mechanism or user input mechanism comprising a camera control button mounted on the frame 503 for haptic or manual engagement by the user. The camera control button provides a bi-modal or single-action mechanism in that it is disposable by the user between only two conditions, namely an engaged condition and a disengaged condition. In this example, the camera control button is a push button that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 503 adjacent to its surface for detecting the presence of a user's finger, to dispose the touch-sensitive button to the engaged condition when the user touches a finger to the corresponding spot on the outer surface 523 of the frame 503. It will be appreciated that the above-described camera control button and capacitive touch button are but two examples of a haptic input mechanism for single-action control of the camera 525, and that other examples may employ different single-action haptic control arrangements.

The computer 521 is configured to perform the methods described herein. In some examples, the computer 521 is coupled to one or more antennas for reception of signals from a GNSS and circuitry for processing the signals where the antennas and circuitry are housed in the glasses 501. In some examples, the computer 521 is coupled to one or more wireless antennas and circuitry for transmitting and receiving wireless signals where the antennas and circuitry are housed in the glasses 501. In some examples, there are multiple sets of antennas and circuitry housed in the glasses 501. In some examples, the antennas and circuitry are configured to operate in accordance with a communication protocol such as Bluetooth™, Low-energy Bluetooth™, IEEE 502.11az/be, and so forth. In some examples, PDR sensors housed in glasses 501 and coupled to the computer 521. In some examples, the glasses 501 are VR headsets where optical elements 514, 515 are opaque screens for displaying images to a user of the VR headset. In some examples, the computer 521 is coupled to user interface elements such as slide or touchpad 527 and button 528. A long press of button 528 resets the glasses 501. The slide or touchpad 527 and button 528 are used for a user to provide input to the computer 521 and/or other electronic components of the glasses 501. The glasses 501 include one or more microphones 530 that are coupled to the computer 521. The glasses 501 include one or more gyroscopes 529.

Power Attribution and Throttling on Apparatuses

Figure 6:
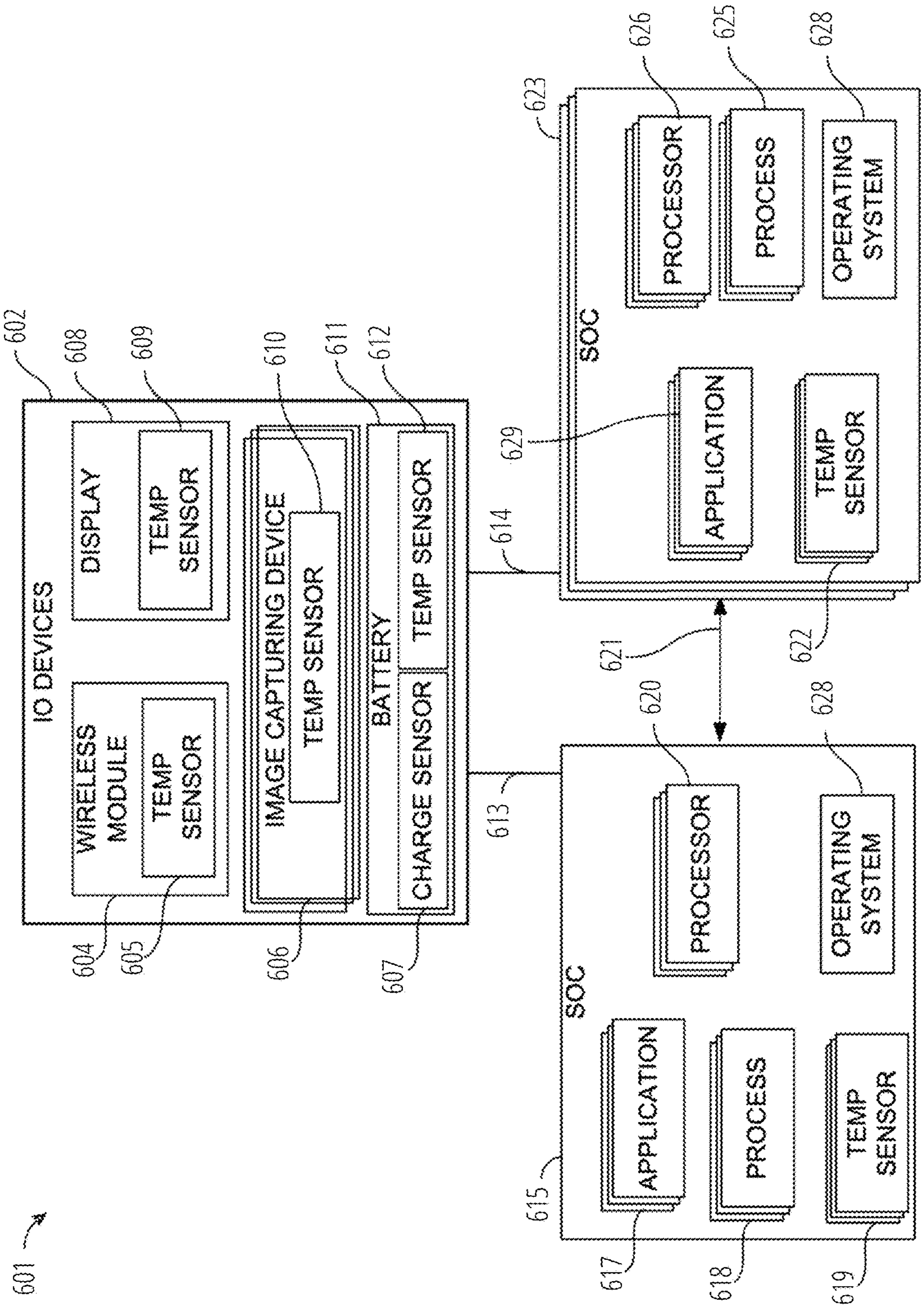
FIG. 6 illustrates a system for power attribution and throttling on mobile devices, in accordance with some examples.

FIG. 6 illustrates a system 601 for power attribution and throttling on mobile devices, in accordance with some examples. The system 601 is an apparatus of a head-wearable apparatus 116 such as glasses 501 of FIG. 5, in accordance with some examples. The system 601 may include other devices such as a portion of the interaction server system 110, and/or the user system 102, that may perform one or more of the operations described herein. In accordance with some examples, the head-wearable apparatus 116 and/or glasses 501 are termed AR wearable devices, MR wearable devices, and/or VR wearable devices.

One or more systems on a chip (SoC or systems on-chip) SOC 615, 623 are connected to input/output (IO) device 602. The SOC 615, 623 include processors 620, 626, applications 617, temperature (temp) sensors 619, and an operating system 628. The SOC 615, 623 may include other components such as memory, other interfaces, on-chip IO devices, timing circuitry, fault circuitry, and so forth. The processors 620, 626 may be graphics processor units (GPU), central processing units (CPUs), and/or another type of processor. The operating system 628 may be distributed across the SOCs 615, 623 and may have separate components per SOC 623. The logic of the operating system 628 may be implemented in one or more of: hardware, firmware, and/or software. The temperature sensors 619, 622 provide data that indicates a temperature or relative temperature of the SOC 615, 623, respectively.

The applications 617, 629 provide functionality such as 3D graphics, graphical compositions, video recording, hand tracking, virtual IO, determining depth of objects from stereo images, and so forth. Additionally, the applications 617, 629 may be applications 617, 629, for users of the apparatus to use such as a card game application, object identification application and so forth. The applications 617, 629 may be software, firmware, or hardware. For example, the applications 617, 629 may reside in a memory of the SOC 615, 623, respectively. The processes 618, 625 are active applications 617, 629 or other instructions that are currently active and being executed by the operating system 628.

The SOCs 615, 623 are connected with an inter-SOC communication bus 621. The SOCs 615, 623 may transfer data such as the applications 617, 629 or information related to the applications 617, 629 and/or processes 618, 625, using the inter-SOC communication bus 621. The applications 617, 629 may be resident with a particular SOC 615, 623 or the applications 617, 629 may be distributed among SOCs 615, 623. The applications 617, 629 may be received via the wireless module 604 or transferred between the SOCs 615, 623.

The IO devices 602 include wireless module 604, display 608, image capturing device 606, and battery 611. The IO devices 602 may include additional devices such as devices that enable the user of the apparatus to receive output or provide input to the system 601 and other IO components 1105, such as is discussed in conjunction with FIG. 11.

The wireless module 604 is configured to perform wireless communication protocols with other devices such as the computing device 114, the interactive server system 110, user system 102, and so forth. The communication protocols include LE Bluetooth, Institute for Electrical and Electronic Engineers (IEEE) 502.11 communication protocols, proprietary communications protocols, communication protocols, and so forth. The wireless module 604 communicates with hardware such as transceiver circuitry and antennas to perform the wireless protocols. The wireless module 604 may communicate with the computing device 114, the interactive server system 110, and/or user system 102 via intermediate devices such as an access point, a node B, and so forth. The display 608 is an electronic device configured to present content to a user of the system 601. For example, the glasses 501 may have an integrated near-eye display mechanism.

The image capturing devices 606 captures images of the real-world with sensors. For example, the sensors may be charge-coupled device (CCD) sensors and the active-pixel sensor (CMOS sensor) sensors. The image capturing device 606 may include color camera sensors, compact vision (CV) camera sensor, and so forth. The IO devices 602 are connected to one or more SOCs 615, 623, via connections 613, 614. The battery 611 is source of electrical power. For example, the battery 611 may be a rechargeable lithium battery. The battery 611 has a charge sensor 607 that generates data that indicates a charge level of the battery 611. The temperature sensors 605, 609, 610, and 612 generate data that indicates a temperature of the wireless module 604, display 608, image capturing devices 606, and battery 611, respectively. There may be more or fewer temperature sensors 605, 609, 610, and 612 and, in some examples, the temperature sensors 605, 609, 610, and 612 indicate a temperature of more than one device.

A technical challenge is how to increase the usefulness of a battery 611 on a mobile device and how to reduce the temperature generation 705. The technical challenge is addressed by, referring to FIG. 6 and FIG. 7, determining a power consumption 702 and temperature generation 705 on a per resource 701 basis for processes 711. An operating system 628 provides the process 711 with information regarding the energy used 714 and the temperature used 717 by the process 711 on per resource 701 basis. The process 711 may reduce its power consumption 702 and temperature generation 705 based on the amount of energy used 714 and/or temperature used 717. Additionally, the operating system 628 may maintain an energy budget 713 and/or temperature budget 716 for the process 711. If the process 711 exceeds its energy budget 713 or temperature budget 716, then a throttle module 710 throttles the process 711. For example, the throttle module 710 changes a state 704 of a resource 701 the process 711 is using such as reducing a clock speed or frequency of a GPU processor 620, 626. This may slow the process 711 but reduce power consumption 702 and temperature generation 705 of the process 711.

In some examples, the designer of the applications 617, 629 uses the information from the operating system 628 regarding the power consumption 702 and temperature generation 705 to reduce the power consumption 702 or the temperature generation 705. For example, there may be a component of the system 601 that is particularly vulnerable to overheating so the application 617, 629 may be designed to reduce the use of the component.

Figure 7:
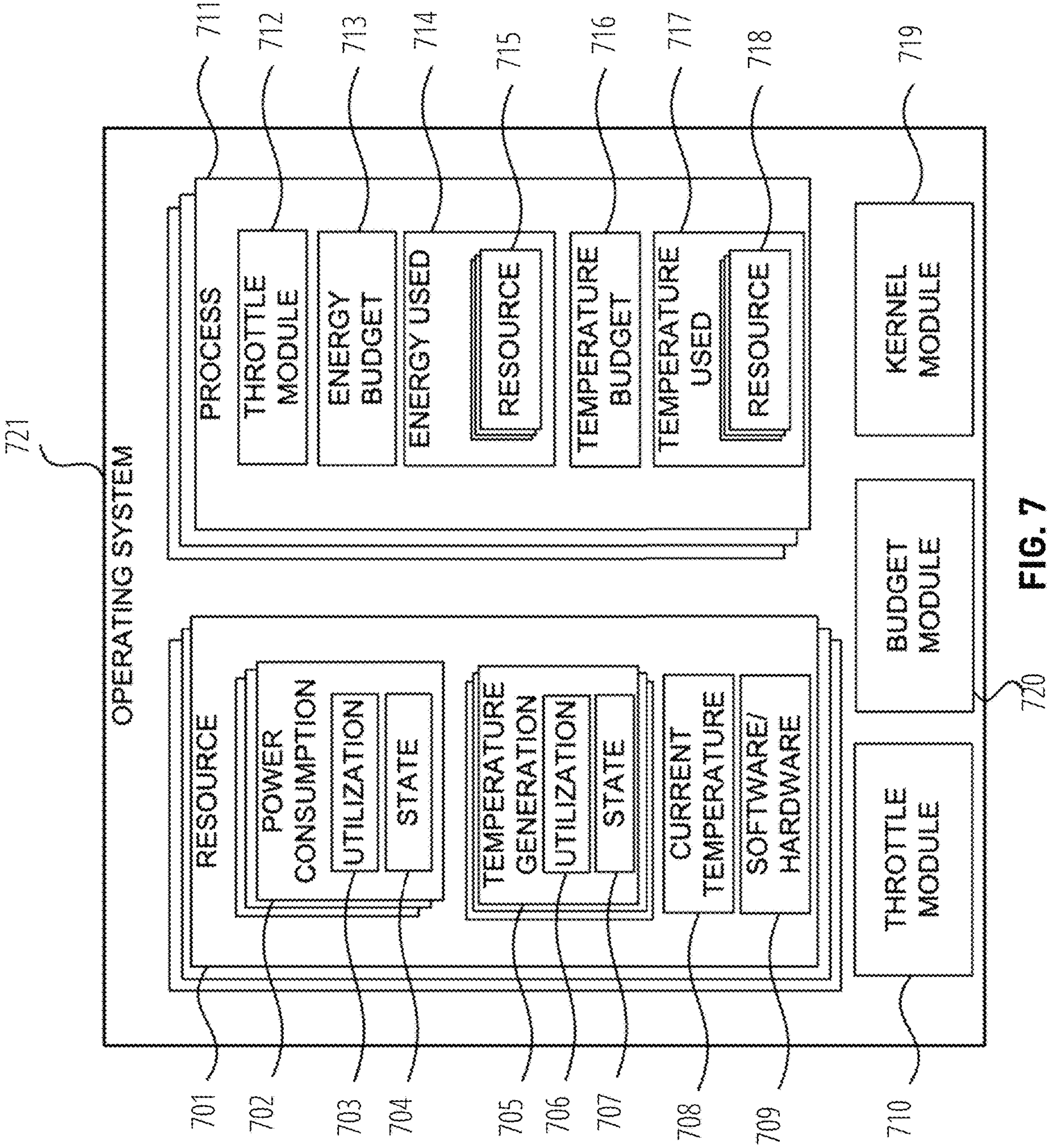
FIG. 7 illustrates the operating system, in accordance with some examples.

FIG. 7 illustrates the operating system 628, in accordance with some examples. The operating system 628 maintains information regarding resources 701 and processes 711. The resources 701 include the IO devices 602, application 617, and so forth. The operating system 628 accesses information regarding the power consumption 702. A power consumption 702 is estimated an estimated power consumption 702 for the resource 701 based on a utilization 703 of the resource 701 and, in some examples, further based on a state 704 of the resource 701. For example, a processor 626 may have different frequency levels, which is represented by the state 704, and the processor 626 has a utilization 703 such as percent that is attributable to a process 711. The operating system 628 can use the power consumption 702 information about the resource 701 to determine the energy used 714 by the process 711.

For example, a resource 701 may be a graphics processing unit (GPU) that at state 704 with a clock speed of 1,000 MHz consumes 905 milli-Watts (mW) per percent of utilization 703 of the GPU resource 701. The operating system 628 can determine based on a time that the process 711 uses the GPU resource 701 and a utilization 703 of the GPU, the energy used 714 in mW-seconds or joules (J) used by the process 711 for the GPU resource 715. The process 711 is an application 617, 629 being executed or run. The process 711 is process 618 and/or process 627. The operating system 628 runs on the SOCs 615, 623 and the process 711 may be run on one or more of the SOCs 615, 623.

The temperature generation 705 is an indication of an increase in temperature based on the utilization 706 and state 707 of the resource 701. For example, continuing with the example above. If the GPU resource 701 is in a 1,000 MHz state 704, then the temperature generation 705 is 0.01 degrees F. per 1 percent utilization 706 per second of use. The temperature generation 705 enables the operating system 628 to attribute a change in the current temperature 708 of a resource 701 because of the use of the resource 701 by a process 711. In some examples, the temperature generation 705 is non-linear and depends on total power consumption 702 and/or on utilization of the resource 701. The kernel module 719 may approximate the temperature generation 705 based on the total power consumption 702 and/or resource utilization.

Software or hardware 709 indicates whether the resource 701 is software or hardware. For example, a process 711 may be an end user application 617, 629 such as identifying objects for the user or playing a video for the user. When the process 711 directly executes and uses a GPU resource 701, then the GPU resource 701 is hardware. And when the process 711 uses an application 617, 629 such as an application 617, 629 to identify hand gestures, then this is software. The application 617, 629 from which the process 711 originated may provide services for other applications 617, 629.

The operating system 628 executes or runs the applications 617, 629, which becomes a process 711 in execution or in being run. The operating system 628 may use an interpreter to run the applications 617, 629, in which case the process 711 being tracked may be the interpreter and the application 617, 629 is attributed with power consumption 702 and temperature generation 705 based on the use of the interpreter resource 701. For example, the operating system 628 attributes the power consumption 702 and temperature generation 705 to an application 617, 629 using the interpreter resource 701, which is a process 711 when being used, based on the power consumption 702 and temperature generation 705 of the interpreter resource 701 when the interpreter resource 701 is running the application 617, 629. The current temperature 708 is an indication of the temperature of the resource 701, which may be determined based on a temperature sensor 605, 609, 612, 619, 622.

When the resource 701 is a software process, the operating system 628 may use previously determined estimates for power consumption 702 and temperature generation 705 for running the software resource 701. For example, for a hand gesture recognition resource 701, the operating system 628 may access information that indicates a power consumption 702 and temperature generation 705 for the hand gesture recognition resource 701 based on an amount of time the hand gesture recognition resource 701 is active and, in some examples, further based on state 704 of the other resources 701 such as the GPU or CPU resource 701.

The operating system 628 monitors processes 711 for energy used 714 per resource 715 and temperature used 717. The energy budget 713 indicates an amount of energy the process 711 is budgeted to use. The energy budget 713 may per resource 701. The temperature budget 716 indicates a change in temperature that the process 711 is budgeted. The temperature budget 716 may be per resource 701.

The kernel module 719 is configured to perform operations that require the kernel of the operating system 628 to perform. For example, the kernel module 719 provides services to stop processes 711 and to log a time a process 711 is started and stopped.

The budget module 720 determines an energy budget 713 and temperature budget 716 for a process 711. In some examples, the energy budget 713 and temperature budget 716 are predetermined and associated with the application 617, 629. In some examples, the energy budget 713 and temperature budget 716 are determined based on current temperatures 708 of the resources and/or the charge of the battery 611 based on the charge sensor 607. The budget module 720 sends to the process 711 updates on the energy used 714 and the temperature used 717 so that the process 711. The budget module 720 sends to the process 711 when the process 711 is completed a total energy used 714 and a total temperature used 717. The budget module 720 determines the power consumption 702 and temperature generation 705 to use for a resource 701 based on the utilization 703, 706, and state 704, 707.

The throttle module 710 performs action when a process 711 exceeds its energy budget 713 or temperature budget 716. For example, when a process 711 exceeds its energy budget 713 or exceeds its temperature budget 716, the throttle module 710 calls the throttle module 712 that is part of the process 711. The throttle module 712 of the process 711 may terminate the process 711, reduce the energy used 714 and/or temperature used 717, or perform another action. The throttle module 710 may perform another action such analyzing the energy used 714 and temperature used 717 and placing a resource 701 that is being used by the process 711 into a state 704 that uses less power consumption 702 and/or temperature generation 705. For example, in the GPU resource 701 example, the throttle module 710 may reduce a number of cores of the GPU resource 701 that are turned on, change the 1,000 MHz state 704 to a 1001 MHz state 704, or reduce the availability of one or more cores of the GPU resource 701 to the process 711.

In some examples, throttle module 712 reduces the features of the application 617, 629. For example, the throttle module 712 may disable hand tracking. The throttle module 710 may reduce or lower a priority of the process 711 so that it is executed or run less frequently. In some examples, the throttle module 710 may throttle the use of a resource 701. For example, if a current temperature 708 of the resource 701 exceeds or transgresses a threshold, the throttle module 710 may reduce access to the resource 701.

In some examples, the throttle module 710 will lower a priority of processes 711 that are using the resource 701. In some examples, the throttle module 710 will suspend processes 711 that request to use the resource 701. In some examples, the throttle module 710 will indicate to the process 711 that using a resource 701 may result in the process 711 being suspended or the throttle module 710 may indicate to the process 711 that the resource 701 is currently unavailable due to its current temperature 708. The throttle module 710 may provide a time period when the resource 701 may become available. In some examples, the throttle module 710 will switch the resource 701 for another resource 701 that may perform the operation. For example, if a GPU resource 701 has a current temperature 708 that exceeds or transgress a threshold temperature, then the throttle module 710 substitutes another GPU resource 701, a CPU resource 701, or sends the operation to be performed by another device.

In some examples, the throttle module 710 may suspend the process 711 or reduce a priority of the process 711. In some examples, the throttle module 710 may remove a resource 701 from the process 711. For example, if the wireless module 604 is becoming too hot, then the throttle module 710 may suspend the use of the wireless module 604 by the process 711 for a period of time. In some examples, the throttle module 710 or throttle module 712 will, in response, to the amount of energy used 714 or the temperature used 717, indicate to the process 711 to offload computationally intensive functions to another device via the wireless module 604. For example, the head-wearable apparatus 116 will offload image processing for hand tracking to a computing device 114 such as a user system 102 that may be mobile phone.

In other examples, the throttle module 710 calls a throttle module 712 of the process 711. The throttle module 712 of the process 711 may determine its own actions to reduce the power consumption 702 and temperature generation 705. For example, the process 711 may reduce the features available for an end-user application 617, 629. The process 711 is an application 617, 629 that is being executed. In some examples, the process 711 reduces the features being offered by not providing hand tracking.

Any reference to a "module" is equally applicable to "component." Namely, any operation performed by the disclosed "modules" can be similarly performed by a respective "component".

Figure 8:
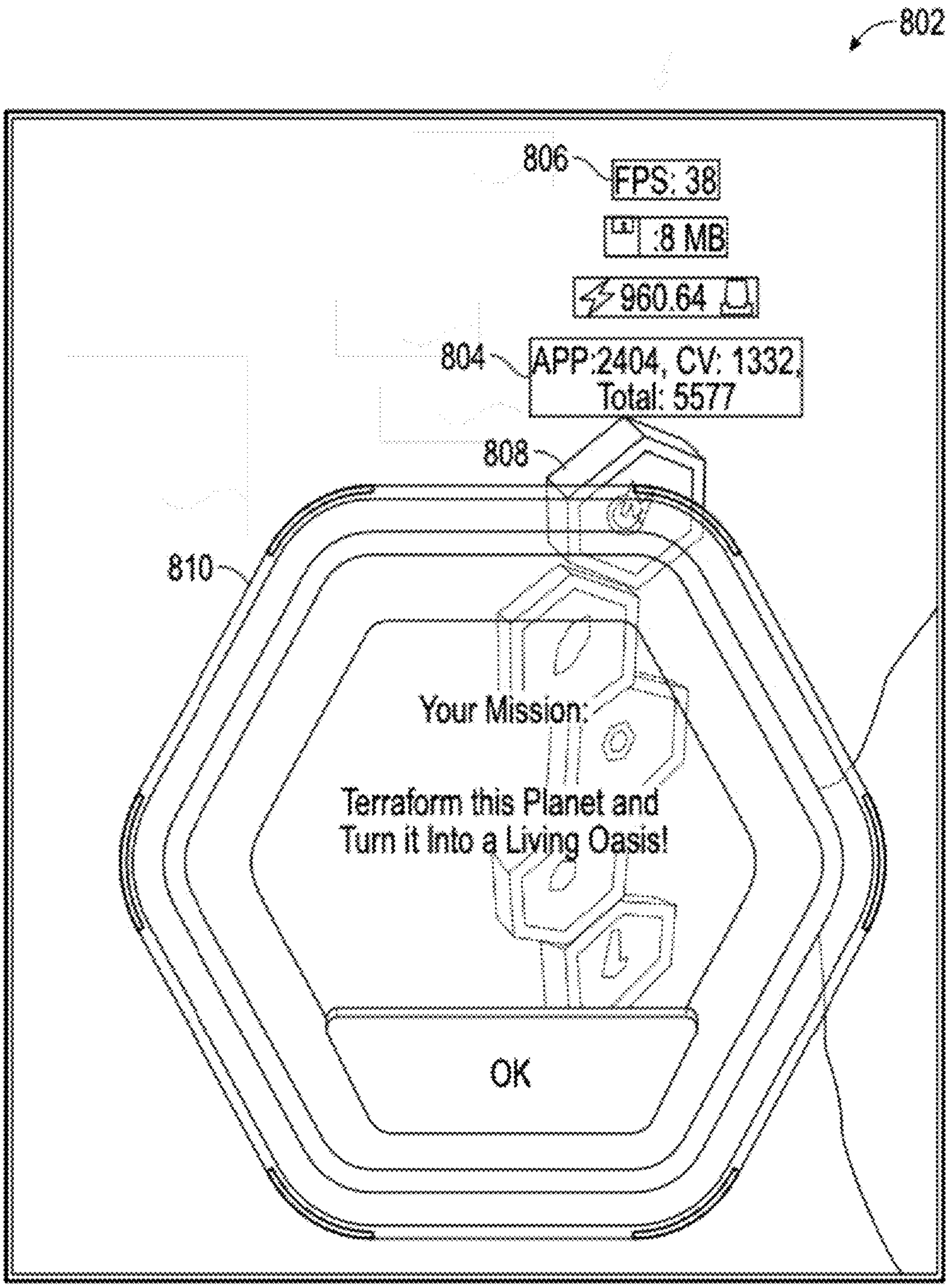
FIG. 8 illustrates an aspect of the subject matter in accordance with one embodiment.

In some examples, the throttle module 710 receives an input model that predicts usage of various AR applications executing on the user system 102. Specifically, the throttle module 710 can determine that a native AR application (e.g., an operating system application) is currently running on the user system 102. The native AR application (shown in FIG. 8, as native AR application 808) can present an AR user interface on a body part, such as a hand of a user. The user interface of the native AR application 808 can be used to access and/or modify various settings of the native AR application 808. In some cases, the user interface of the native AR application 808 can include one or more options for running or launching respective creator AR applications 810. The creator AR applications 810 can include any application that provides a respective AR experience and that can be independently launched on the user system 102. The creator AR application 810 can be developed by a third party entity relative to an entity that provides the native AR application 808. For example, the creator AR application 810 can include any one of the applications 106.

Once launched, the native AR application 808 can monitor usage of the various AR applications. In some cases, each creator AR application 810 can provide a respective user interface with AR elements. The user interface of the creator AR application 810 can be presented together with and concurrently with the user interface of the native AR application 808. The native AR application 808 (or other operating system of the user system 102) can monitor usage of the applications running of the user system 102. The native AR application 808 can assign a usage budget to each application (or service) that is currently running on the user system 102. The native AR application 808 (or other operating system of the user system 102) can detect when any one of the applications or services has a usage that exceeds the respective usage budget that is assigned to the application or service.

In some cases, a first external AR application can be assigned or associated with a first usage budget and a second external AR application can be assigned or associated with a second usage budget. The usage budgets can be assigned to different external AR applications based on various criteria, such as identity of the developer, a resource provided by the developer, popularity of the developer, and so forth. In some cases, all of the external AR application are assigned the same usage budget. The usage budget can include or represent any type or resource usage, such as temperature of the user system 102, CPU usage of the user system 102, frames per second associated with graphics of the user interface of the corresponding external AR application, and so forth. The usage budget can be based on any measurable statistic or metric provided by the budget module 720, resource 701, and/or processes 711 or model (representing power attribution) derived from information received from these components. Any operations discussed with reference to the native AR application 808 can be similarly performed by the operating system 721 and vice versa.

In some examples, the operating system 721 maintains a list of tiers of different applications and/or services that can run on the user system 102. The list of tiers can be prioritized. Each application/service on the list of tiers can be associated with a different usage budget. The list of tiers can include a first tier that includes a list of low priority services (e.g., telemetric sensors, GPS sensors, background operations including downloading of messages from a server, and so forth). The list of tiers can include a second tier that includes identifiers of external AR applications having a medium priority that is greater than the low priority services. The list of tiers can include a third tier that includes identifiers of native AR applications having a high priority that is greater than the medium and low priorities. Applications or services on the third tier can include services of the operating system 721 used to present user interface elements of the native AR application 808.

In some examples, the operating system 721 determines that an individual external AR application has a usage that is transgressing the usage budget of the individual external AR application or is predicted to transgress within a threshold period of time. In response, the operating system 721 can adjust one or more operations of the individual external AR application to reduce the usage of the individual external AR application so it does not exceed the usage budget while allowing the individual external AR application to continue operating. The operating system 721 can adjust these operations without modifying the operations of the native AR application 808 or other applications or services. For example, the operating system 721 can reduce the frames per second (FPS) at which graphical elements of the individual external AR application are presented without changing the FPS of the native AR application 808. This way, the individual external AR application can continue to be used with a lower QoS in the display of the user interface of the individual external AR application while the native AR application 808 can continue to be used to exit the individual external AR application or perform other system functions at the same FPS (the nominal FPS associated with the native AR application 808). This way, if the user moves the user system 102 to a portion of the real-world environment where a user's hand is detected, a user interface of the native AR application 808 can be retrieved and displayed on the user's hand at the optimal FPS while the user interface of the individual external AR application continues to be displayed simultaneously at the lower FPS.

In some examples, the operating system 721 can present a user interface element that indicates the current usage 804 of the individual external AR application. The user interface element can also include the current FPS 806 of the individual external AR application. The FPS 806 presented in the user interface element can be dynamically adjusted (increased or decreased) to keep the usage 804 of the individual external AR application within the usage budget of the individual external AR application. In some cases, input can be received to update the user interface element to present the usage of the native AR application 808. In response, the FPS 806 can be shown and may not be changed while the FPS of the individual external AR application is decreasing to keep the usage of the individual external AR application within the usage budget.

In some examples, the operating system 721 can first attempt to remove or reduce operations of applications and services on the first tier before modifying operations of applications and services on the second and third tiers. Namely, in response to the operating system 721 determining that usage of the individual external AR application is exceeding the usage budget of the individual external AR application, the operating system 721 can identify one or more services on the first tier that are currently running. The operating system 721 can terminate or slow down the identified one or more services. The operating system 721 can then determine whether the usage budget of the user system 102 is now within the threshold usage limits even while the individual external AR application has a usage that exceeds the corresponding usage budget. If so, the operating system 721 can determine whether any additional services or applications are on the first tier and can be terminated or reduced. If there are not additional services or applications on the first tier that can be terminated or reduced, the operating system 721 can now access applications on the second tier. The operating system 721 can determine that the individual external AR application is on the second tier and, in response, the operating system 721 can reduce operations of the individual external AR application, such as the FPS of the individual external AR application to reduce usage of the individual external AR application to below the corresponding usage budget.

In some examples, the operating system 721 can receive a message or access configuration information for the individual external AR application. The operating system 721, based on the message or configuration information, determines that usage of the individual external AR application beyond the usage budget is requested for a certain period of time. The operating system 721 can determine what operation of the individual external AR application is specified in the message as being known to have a usage that exceeds the usage budget of the individual external AR application.

The operating system 721 can determine whether the current operation of the individual external AR application that is running matches the operation specified in the message or configuration. In response, the operating system 721 allows the usage of the individual external AR application to transgress the usage budget for the time period or interval specified in the message or configuration information. The operating system 721 can initialize a timer and begin running a timer in response to determining that the operation of the individual external AR application that is currently running exceeds the usage budget of the individual external AR application and is on the list of operations requested by the individual external AR application to allow to run while exceeding the usage budget. The operating system 721 can continue to allow the operation of the individual external AR application to run while the timer is below the specified time interval in the configuration information or message. The operating system 721 can determine that the timer has reached the specified time interval. In response, the operating system 721 determines whether the operation of the individual external AR application is still running. If so, the operating system 721 can now terminate and/or reduce operations of one or more services and/or applications starting with the first tier and going to the second tier. For example, the operating system 721 can reduce the FPS of the individual external AR application because the operation of the individual external AR application ran for longer than the requested time period in the message.

Figure 9:
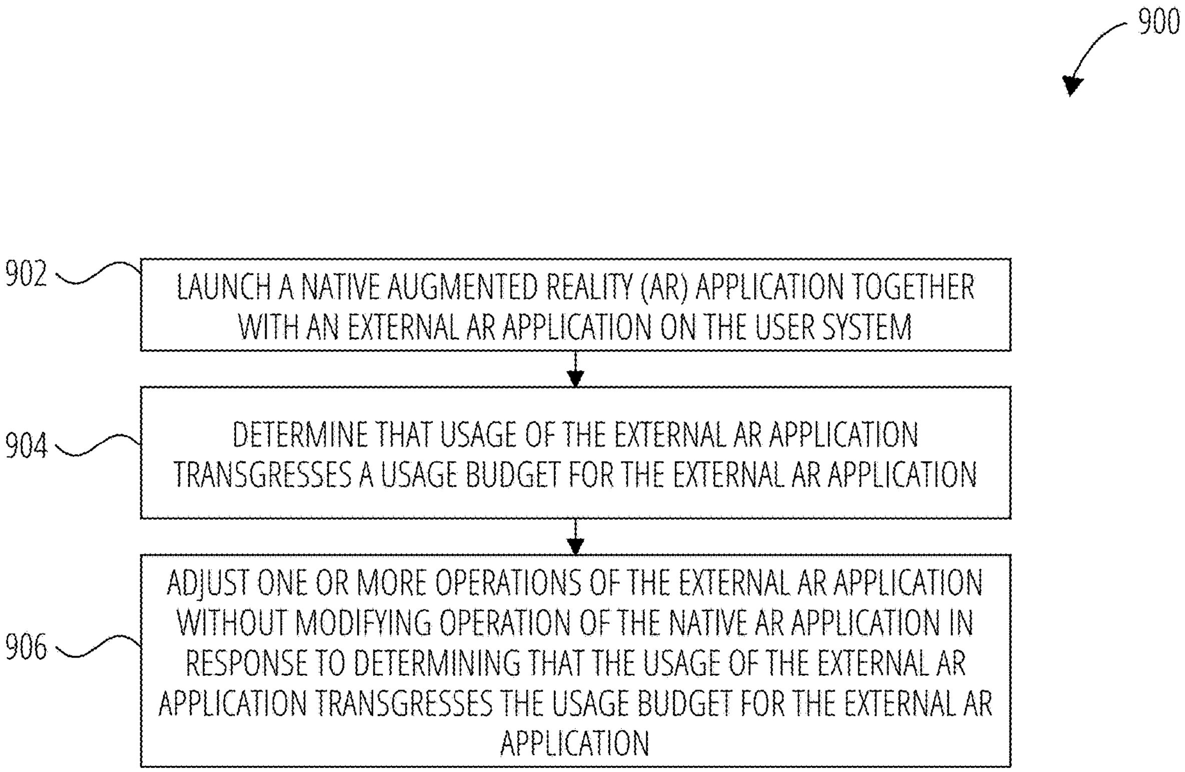
FIG. 9 illustrates a method for power attribution on mobile devices, in accordance with some examples.

FIG. 9 illustrates a method 900 (or process) for power attribution on mobile devices, in accordance with some examples. The method 900 can perform various operations. For example, the operating system 721 can, at operation 902, launch a native AR application together with an external AR application on the user system, as discussed above. Then, at operation 904, the operating system 721 can determine that usage of the external AR application transgresses a usage budget for the external AR application, as discussed above. At operation 906, the operating system 721 can adjust one or more operations of the external AR application without modifying operation of the native AR application in response to determining that the usage of the external AR application transgresses the usage budget for the external AR application, as discussed above.

The method 900 may optionally include one or more additional operations. The operations of method 900 may be performed in a different order. One or more of the operations of method 900 may be optional.

System with Head-Wearable Apparatus

Figure 10:
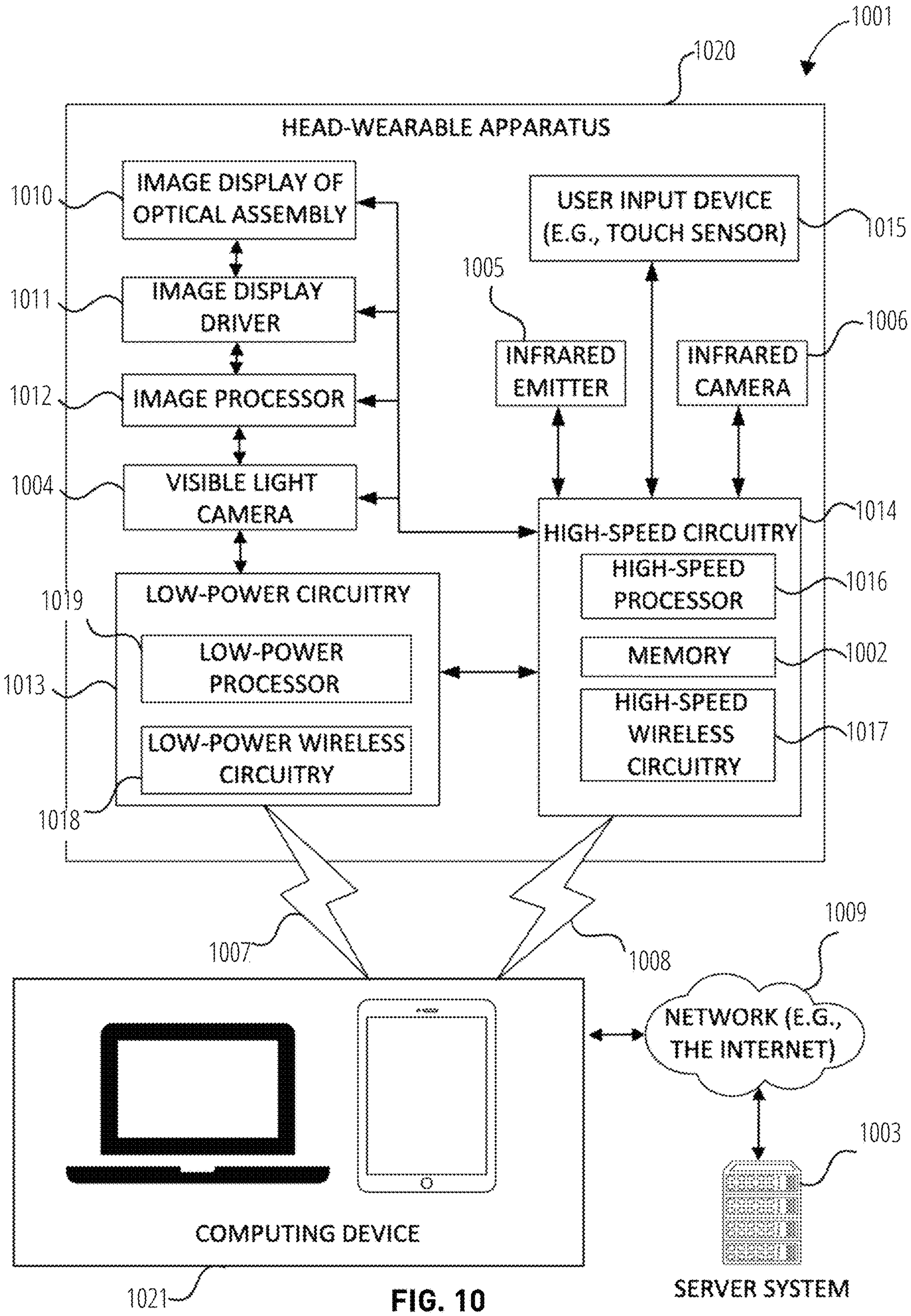
FIG. 10 illustrates a system in which the head-wearable apparatus, according to some examples.

FIG. 10 illustrates a system 1001 including a head-wearable apparatus 116 with a selector input device, according to some examples. FIG. 10 is a high-level functional block diagram of an example head-wearable apparatus 116 communicatively coupled to a computing device 1021 and various server systems 1003 (e.g., the interaction server system 110) via various networks 108.

The head-wearable apparatus 116 includes one or more cameras, each of which may be, for example, a visible light camera 1004, an infrared emitter 1005, and an infrared camera 1006.

The computing device 114 connects with head-wearable apparatus 116 using both a low-power wireless connection 1007 and a high-speed wireless connection 1008. The computing device 114 is also connected to server systems 1003 and the network 1009, in accordance with some examples. The computing device 1021 may be a portable computing device such as a smart phone, tablet, laptop, or another type of computing device 1021 such as a desktop computer, or another type of computing device 1021.

The head-wearable apparatus 116 further includes two image displays of the image display of optical assembly 1010. The two image displays of optical assembly 1010 include one associated with the left lateral side and one associated with the right lateral side of the head-wearable apparatus 116. The head-wearable apparatus 116 also includes an image display driver 1011, an image processor 1012, low-power processor 1019, and high-speed wireless circuitry 1017. The optical assembly 1010 is for presenting images and videos, including an image that can include a graphical user interface to a user of the head-wearable apparatus 116.

The image display driver 1011 commands and controls the image display of optical assembly 1010. The image display driver 1011 may deliver image data directly to the optical assembly 1010 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device (e.g., touch sensor or push button), including an input surface on the head-wearable apparatus 116. The user input device 1015 (e.g., touch sensor or push button) is to receive from the user an input selection to manipulate the graphical user interface of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset or all of the functions described herein. The memory 1002 can also include storage device.

As shown in FIG. 10, the high-speed circuitry 1014 includes a high-speed processor 1016, a memory 1002, and high-speed wireless circuitry 1017. In some examples, the image display driver is coupled to the high-speed circuitry 1014 and operated by the high-speed processor 1016 in order to drive the left and right image displays of the image display of optical assembly 1010. The high-speed processor 1016 may be any processor capable of managing high-speed communications and operation of any general computing system needed for the head-wearable apparatus 116. The high-speed processor 1016 includes processing resources needed for managing high-speed data transfers on a high-speed wireless connection 1008 to a wireless local area network (WLAN) using the high-speed wireless circuitry 1017. In certain examples, the high-speed processor 1016 executes an operating system such as a LINUX operating system or other such operating system of the head-wearable apparatus 116, and the operating system is stored in the memory 1002 for execution. In addition to any other responsibilities, the high-speed processor 1016 executing a software architecture for the head-wearable apparatus 116 is used to manage data transfers with high-speed wireless circuitry 1017. In certain examples, the high-speed wireless circuitry 1017 is configured to implement Institute of Electrical and Electronic Engineers (IEEE) 802.11 communication standards, also referred to herein as WiFi. In some examples, other high-speed communications standards may be implemented by the high-speed wireless circuitry 1017.

The low-power wireless circuitry 1018 and the high-speed wireless circuitry 1017 of the head-wearable apparatus 116 can include short-range transceivers (Bluetooth™) and wireless wide, local, or wide area network transceivers (e.g., cellular or WiFi). Computing device 1021, including the transceivers communicating via the low-power wireless connection 1007 and the high-speed wireless connection 1008, may be implemented using details of the architecture of the head-wearable apparatus 116, as can other elements of the network 1009.

The memory 1002 includes any storage device capable of storing various data and applications, including, among other things, camera data generated by the left and right visible light cameras 1004, the infrared camera 1006, and the image processor 1012, as well as images generated for display by the image display driver 1011 on the image displays of the image display of optical assembly 1010. While the memory 1002 is shown as integrated with high-speed circuitry 1014, in some examples, the memory 1002 may be an independent standalone element of the head-wearable apparatus 116. In certain such examples, electrical routing lines may provide a connection through a chip that includes the high-speed processor 1016 from the image processor 1012 or the low-power processor 1019 to the memory 1002. In some examples, the high-speed processor 1016 may manage addressing of the memory 1002 such that the low-power processor 1019 will boot the high-speed processor 1016 any time that a read or write operation involving memory 1002 is needed.

As shown in FIG. 10, the low-power processor 1019 or high-speed processor 1016 of the head-wearable apparatus 116 can be coupled to the camera (visible light camera 1004, infrared emitter 1005, or infrared camera 1006), the image display driver 1011, the user input device 1015 (e.g., touch sensor or push button), and the memory 1002.

The head-wearable apparatus 116 is connected to a host computer. For example, the head-wearable apparatus 116 is paired with the computing device 1021 via the high-speed wireless connection 1008 or connected to the server system 1003 via the network 1009. The server system 1003 may be one or more computing devices as part of a service or network computing system, for example, that includes a processor, a memory, and network communication interface to communicate over the network 1009 with the computing device 114 and the head-wearable apparatus 116.

The computing device 1021 includes a processor and a network communication interface coupled to the processor. The network communication interface allows for communication over the network 1009, low-power wireless connection 1007, or high-speed wireless connection 1008. Computing device 1021 can further store at least portions of the instructions for generating binaural audio content in the computing device 1021's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1011. The output components of the head-wearable apparatus 116 further include acoustic components (e.g., speakers), haptic components (e.g., a vibratory motor), other signal generators, and so forth. The input components of the head-wearable apparatus 116, the computing device 1021, and server system server systems 1003, such as the user input device 1015, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections low-power wireless connection 1007 and high-speed wireless connection 1008 from the computing device 1021 via the low-power circuitry 1013 or high-speed circuitry 1014.

Machine Architecture

Figure 11:
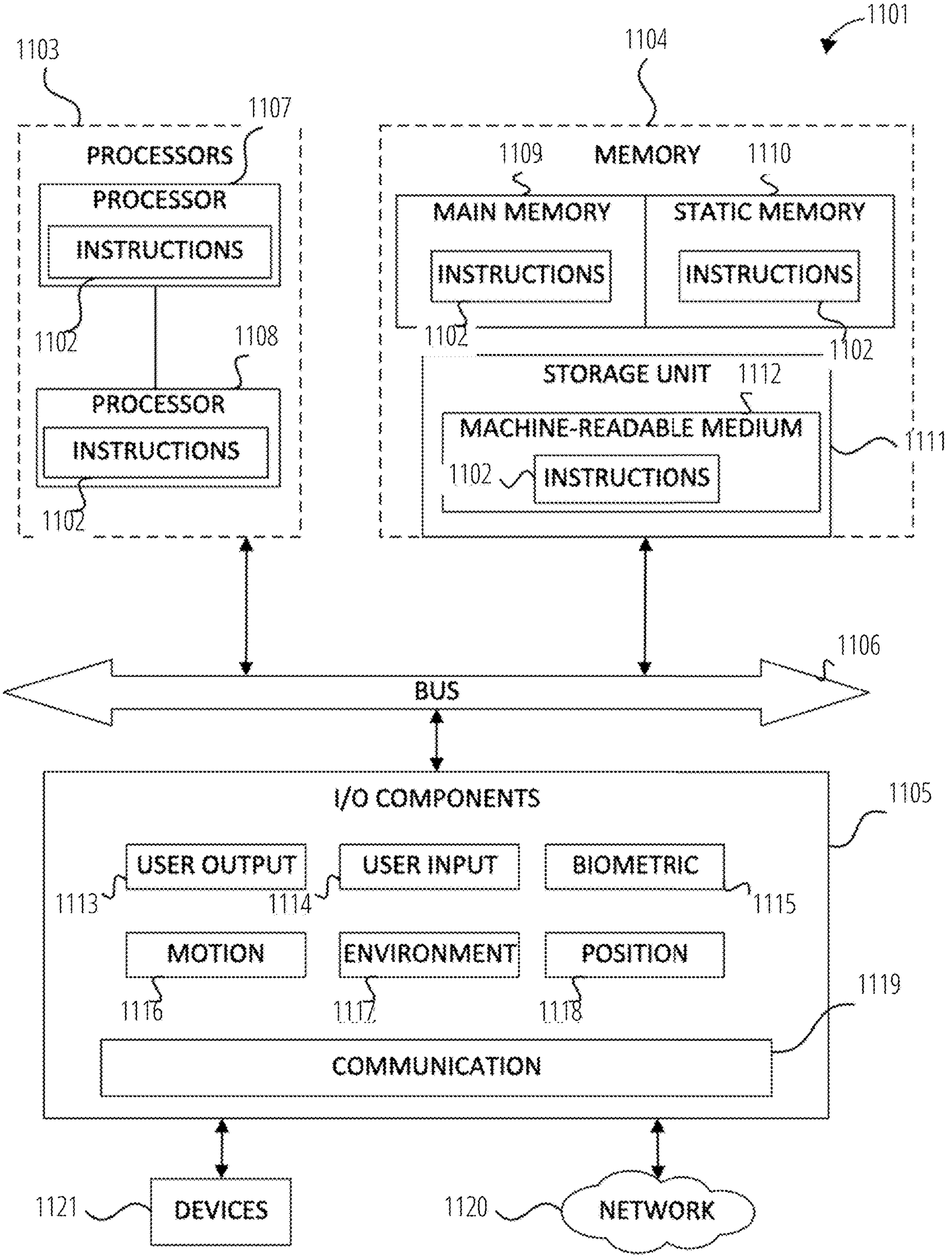
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1101 within which instructions 1102 (e.g., software, a program, an application, an applet, an app, or other executable code) for causing the machine 1101 to perform any one or more of the methodologies discussed herein may be executed. For example, the instructions 1102 may cause the machine 600 to execute any one or more of the methods described herein. The instructions 1102 transform the general, non-programmed machine 1101 into a particular machine 1101 programmed to carry out the described and illustrated functions in the manner described. The machine 1101 may operate as a standalone device or may be coupled (e.g., networked) to other machines. In a networked deployment, the machine 1101 may operate in the capacity of a server machine or a client machine in a server-client network environment, or as a peer machine in a peer-to-peer (or distributed) network environment. The machine 1101 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1101. Further, while a single machine 1101 is illustrated, the term "machine" shall also be taken to include a collection of machines that individually or jointly execute the instructions 1102 to perform any one or more of the methodologies discussed herein. The machine 1101, for example, may comprise the user system 102 or any one of multiple server devices forming part of the interaction server system 110. In some examples, the machine 1101 may also comprise both client and server systems, with certain operations of a particular method or algorithm being performed on the server-side and with certain operations of the particular method or algorithm being performed on the client-side.

The machine 1101 may include processors 1103, memory 1104, and input/output I/O components 1105, which may be configured to communicate with each other via a bus 1106. In an example, processor 1107 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1107 and a processor 1108 that execute the instructions 1102. The term "processor" is intended to include multi-core processors that may comprise two or more independent processors (sometimes referred to as "cores") that may execute instructions contemporaneously. Although FIG. 11 shows multiple processors 1107, the machine 1101 may include a single processor with a single-core, a single processor with multiple cores (e.g., a multi-core processor), multiple processors with a single core, multiple processors with multiples cores, or any combination thereof.

The memory 1104 includes a main memory 1109, a static memory 1110, and a storage unit 1111, both accessible to the processors 1103 via the bus 1106. The main memory 1109, the static memory 1110, and storage unit 1111 store the instructions 1102 embodying any one or more of the methodologies or functions described herein. The instructions 1102 may also reside, completely or partially, within the main memory 1109, within the static memory 1110, within machine-readable medium within the storage unit 1111, within at least one of the processors 1107 (e.g., within the processor's cache memory), or any suitable combination thereof, during execution thereof by the machine 1101.

The I/O components 1105 may include a wide variety of components to receive input, provide output, produce output, transmit information, exchange information, capture measurements, and so on. The specific I/O components 1105 that are included in a particular machine will depend on the type of machine. For example, portable machines such as mobile phones may include a touch input device or other such input mechanisms, while a headless server machine will likely not include such a touch input device. It will be appreciated that the I/O components may include many other components that are not shown in FIG. 11. In various examples, the I/O components 1105 may include user output components 1113 and user input components 1114. The user output components 1113 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1105 may include biometric components 1115, motion components 1116, environmental components 1117, or position components 1118, among a wide array of other components. For example, the biometric components 1115 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 11166 include acceleration sensor components (e.g., accelerometer), gravitation sensor components, rotation sensor components (e.g., gyroscope).

The environmental components 1117 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1118 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1105 further include communication components 1119 operable to couple the machine 1101 to a network 1120 or devices 1121 via respective coupling or connections. For example, the communication components 1119 may include a network interface component or another suitable device to interface with the network 1120. In further examples, the communication components 1119 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices may be another machine or any of a wide variety of peripheral devices (e.g., a peripheral device coupled via a USB).

Moreover, the communication components 1119 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 636, such as location via Internet Protocol (IP) geolocation, location via Wi-Fi® signal triangulation, location via detecting an NFC beacon signal that may indicate a particular location, and so forth.

The various memories (e.g., main memory 1109, static memory 1110, and memory of the processors 1103) and storage unit 1111 may store one or more sets of instructions and data structures (e.g., software) embodying or used by any one or more of the methodologies or functions described herein. These instructions (e.g., the instructions 1102), when executed by processors 1107, cause various operations to implement the disclosed examples.

The instructions 1102 may be transmitted or received over the network 1120, using a transmission medium, via a network interface device (e.g., a network interface component included in the communication components 1119) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices.

Software Architecture

Figure 12:
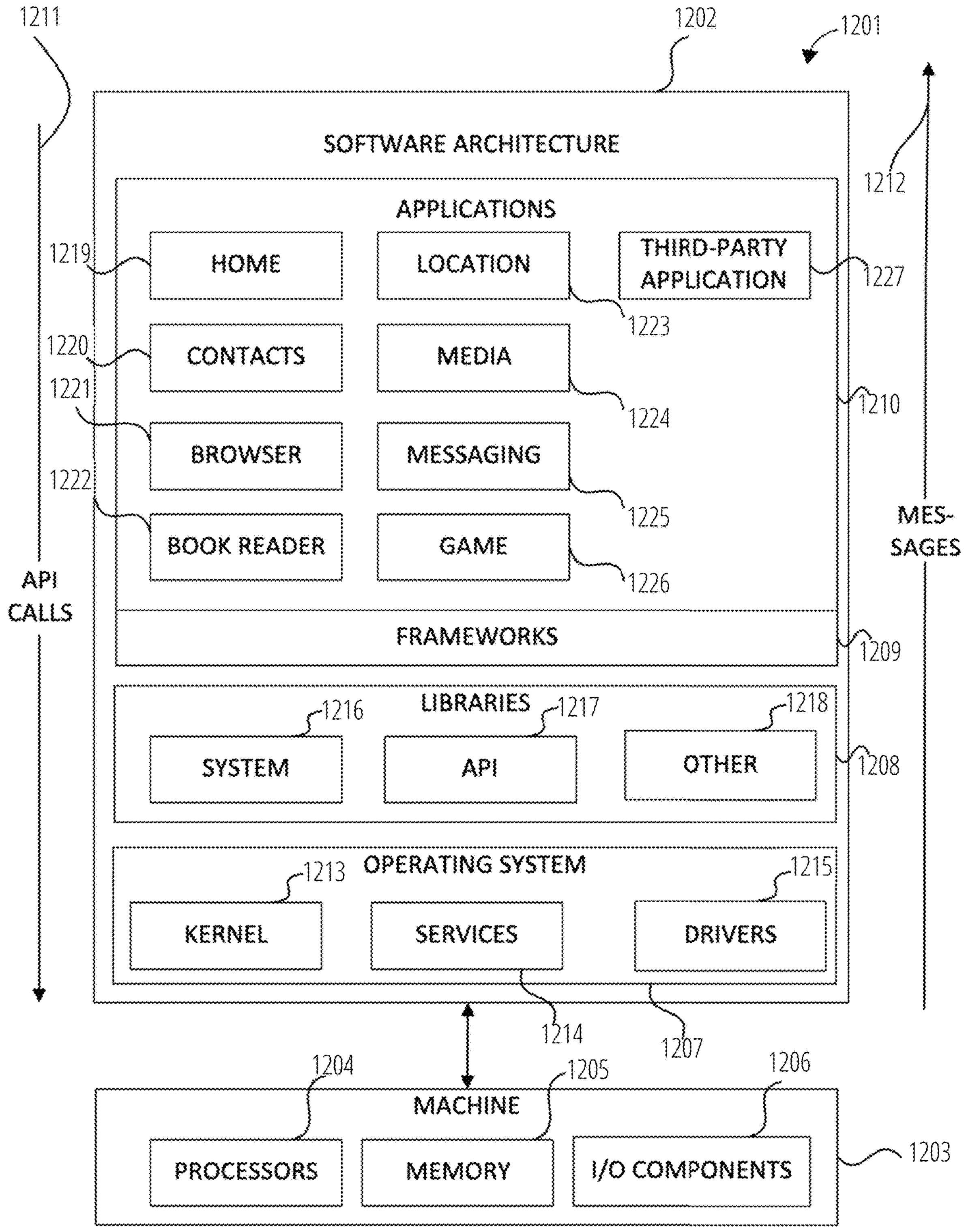
FIG. 12 is a block diagram showing a software architecture within which examples may be implemented.

FIG. 12 is a block diagram 1201 illustrating a software architecture 1202, which can be installed on any one or more of the devices described herein. The software architecture 1202 is supported by hardware such as a machine 1203 that includes processors 1204, memory 1205, and I/O components 1206. In this example, the software architecture 1202 can be conceptualized as a stack of layers, where each layer provides a particular functionality. The software architecture 1202 includes layers such as an operating system 1207, libraries 1208, frameworks 1209, and applications 1210. Operationally, the applications 1210 invoke API calls 1211 through the software stack and messages 1212 in response to the API calls 1211.

The operating system 1207 manages hardware resources and provides common services. The operating system 1207 includes, for example, a kernel 1213, services 1214, and drivers 1215. The kernel 1213 acts as an abstraction layer between the hardware and the other software layers. For example, the kernel 724 provides memory management, processor management (e.g., scheduling), component management, networking, and security settings, among other functionalities. The services 726 can provide other common services for the other software layers. The drivers 728 are responsible for controlling or interfacing with the underlying hardware. For instance, the drivers 728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1208 provide a common low-level infrastructure used by the applications 1210. The libraries 1208 can include system libraries 1216 (e.g., C standard library) that provide functions such as memory allocation functions, string manipulation functions, mathematic functions, and the like. In addition, the libraries 1208 can include API libraries 1217 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1208 can also include a wide variety of other libraries 1218 to provide many other APIs to the applications 1210.

The frameworks 1209 provide a common high-level infrastructure that is used by the applications 1210. For example, the frameworks 1209 provide various graphical user interface (GUI) functions, high-level resource management, and high-level location services. The frameworks 1209 can provide a broad spectrum of other APIs that can be used by the applications 1210, some of which may be specific to a particular operating system or platform.

In an example, the applications 1210 may include a home application 1219, a contacts application 1220, a browser application 1221, a book reader application 1222, a location application 1223, a media application 1224, a messaging application 1225, a game application 1226, and a broad assortment of other applications such as a third-party application 1227. The applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third-party application 1227 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1227 can invoke the API calls 1211 provided by the operating system 1207 to facilitate functionalities described herein.

Glossary

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture.

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems. Additional claimable subject matter further includes the following:

Example 1. A user system comprising: at least one processor; and a memory storing instructions that, when executed by the at least one processor, configure the user system to perform operations comprising: launching a native augmented reality (AR) application together with an external AR application on the user system; determining that usage of the external AR application transgresses a usage budget for the external AR application; and adjusting one or more operations of the external AR application without modifying operation of the native AR application in response to determining that the usage of the external AR application transgresses the usage budget for the external AR application.

Example 2. The user system of Example 1, wherein the operations comprise: estimating an energy usage used by the external AR application, the estimating based on a resource utilization, a resource usage duration, or operating modes.

Example 3. The user system of Example 2, wherein the estimate energy usage comprises estimated power usage for one or more software components used by the external AR application and one or more hardware components used by the external AR application.

Example 4. The user system of any one of Examples 1-3, wherein the usage budget comprises a maximum amount of power available to be consumed by the external AR application.

Example 5. The user system of any one of Examples 1-4, wherein adjusting the one or more operations of the external AR application comprises reducing a frame rate associated with a first user interface (UI) of the external AR application without modifying the frame rate associated with presentation of a second UI of the native AR application.

Example 6. The user system of Example 5, wherein the operations comprise: presenting one or more elements of the first UI at a first frame rate concurrently with presenting one or more elements of the second UI at a second frame rate, the second frame rate being greater than the first frame rate.

Example 7. The user system of any one of Examples 1-6, wherein the operations further comprise: accessing a list of tiers, each tier in the list of tiers being associated with a different priority level; and determining that the native AR application is on a first tier in the list of tiers and that the external AR application is on a second tier in the list of tiers, the second tier being of a lower priority than the first tier.

Example 8. The user system of Example 7, wherein the operations comprise: adjusting one or more operations of the external AR application without modifying operation of the native AR application in response to determining that the native AR application is on the first tier in the list of tiers and that the external AR application is on the second tier in the list of tiers.

Example 9. The user system of any one of Examples 7-8, wherein the operations comprise: identifying a service running on the user system that is on a third tier in the list of tiers, the third tier being of a lower priority than the first and second tiers; and in response to identifying the service that is on the third tier in the list of tiers, reducing usage of the service prior to adjusting the one or more operations of the external AR application.

Example 10. The user system of Example 9, wherein the operations comprise: determining that there exist no remaining services on the third tier which can operate at a reduced usage; and adjusting the operations of the external AR application in response to determining that there exist no remaining services on the third tier which can operate at the reduced usage.

Example 11. The user system of any one of Examples 1-10, wherein the operations further comprise: estimating a temperature usage used by the external AR application as the usage, wherein the usage budget comprises a maximum temperature threshold.

Example 12. The user system of any one of Examples 1-11, wherein the operations further comprise: estimating a battery usage used by the external AR application as the usage, wherein the usage budget comprises a maximum battery usage threshold.

Example 13. The user system of any one of Examples 1-12, wherein the operations further comprise: presenting one or more elements of the native AR application on a hand of a user associated with the user system at a nominal frame rate associated with the native AR application in response to determining that the usage of the external AR application transgresses the usage budget for the external AR application.

Example 14. The user system of any one of Examples 1-13, wherein the operations further comprise: launching the external AR application by the native AR application; and monitoring usage of the external AR application by the native AR application.

Example 15. The user system of Example 14, wherein the operations further comprise: receiving, by the native AR application, a message from the external AR application associated with the user, the message specifying a time interval during which the usage of the external AR application will transgress the usage budget.

Example 16. The user system of Example 15, wherein the operations comprise: delaying the adjusting of the one or more operations of the external AR application without modifying operation of the native AR application based on the message.

Example 17. The user system of Example 16, wherein the operations comprise: initiating a timer in response to determining that the usage of the external AR application transgresses the usage budget for the external AR application; and delaying the adjusting of the one or more operations of the external AR application without modifying operation of the native AR application while the timer fails to transgress the time interval.

Example 18. The user system of Example 17, wherein the operations comprise: adjusting of the one or more operations of the external AR application without modifying operation of the native AR application in response to determining that the timer transgresses the time interval and in response to determining that the usage of the external AR application continues to transgress the usage budget.

Example 19. A non-transitory computer-readable storage medium including instructions that, when processed by a user system, configure the user system to perform operations comprising: launching a native augmented reality (AR) application together with an external AR application on the user system; determining that usage of the external AR application transgresses a usage budget for the external AR application; and adjusting one or more operations of the external AR application without modifying operation of the native AR application in response to determining that the usage of the external AR application transgresses the usage budget for the external AR application.

Example 20. A method performed on a user system, the method comprising: launching a native augmented reality (AR) application together with an external AR application on the user system; determining that usage of the external AR application transgresses a usage budget for the external AR application; and adjusting one or more operations of the external AR application without modifying operation of the native AR application in response to determining that the usage of the external AR application transgresses the usage budget for the external AR application.

What is claimed is:

1. A user system comprising:

at least one processor; and a memory storing instructions that, when executed by the at least one processor, configure the user system to perform operations comprising:

launching a native augmented reality (AR) application together with an external AR application on the user system;

determining that usage of the external AR application transgresses a usage budget for the external AR application; and in response to determining that the usage of the external AR application transgresses the usage budget for the external AR application, reducing a frame rate associated with a first user interface (UI) of the external AR application without modifying the frame rate associated with presentation of a second UI of the native AR application.

2. The user system of claim 1, wherein the operations comprise:

estimating an energy usage used by the external AR application, the estimating based on a resource utilization, a resource usage duration, and an operating mode.

3. The user system of claim 2, wherein the estimated energy usage comprises estimated power usage for one or more software components used by the external AR application and one or more hardware components used by the external AR application.

4. The user system of claim 1, wherein the usage budget comprises a maximum amount of power available to be consumed by the external AR application.

5. The user system of claim 1, the operations comprise adjusting one or more operations of the external AR application in response to determining that a timer transgresses a time interval and in response to determining that usage of the external AR application continues to transgress the usage budget.

6. The user system of claim 1, wherein the operations comprise:

presenting one or more elements of the first UI at a first frame rate concurrently with presenting one or more elements of the second UI at a second frame rate, the second frame rate being greater than the first frame rate.

7. The user system of claim 1, wherein the operations further comprise:

accessing a list of tiers, each tier in the list of tiers being associated with a different priority level; and determining that the native AR application is on a first tier in the list of tiers and that the external AR application is on a second tier in the list of tiers, the second tier being of a lower priority than the first tier.

8. The user system of claim 7, wherein the operations comprise:

adjusting one or more operations of the external AR application without modifying operation of the native AR application in response to determining that the native AR application is on the first tier in the list of tiers and that the external AR application is on the second tier in the list of tiers.

9. The user system of claim 7, wherein the operations comprise:

identifying a service running on the user system that is on a third tier in the list of tiers, the third tier being of a lower priority than the first and second tiers; and in response to identifying the service that is on the third tier in the list of tiers, reducing usage of the service prior to adjusting one or more operations of the external AR application.

10. The user system of claim 9, wherein the operations comprise:

determining that there exist no remaining services on the third tier which can operate at a reduced usage; and adjusting the one or more operations of the external AR application in response to determining that there exist no remaining services on the third tier which can operate at the reduced usage.

11. The user system of claim 1, wherein the operations further comprise:

estimating a temperature usage used by the external AR application as the usage, wherein the usage budget comprises a maximum temperature threshold.

12. The user system of claim 1, wherein the operations further comprise:

estimating a battery usage used by the external AR application as the usage, wherein the usage budget comprises a maximum battery usage threshold.

13. The user system of claim 1, wherein the operations further comprise:

presenting one or more elements of the native AR application on a hand of a user associated with the user system at a nominal frame rate associated with the native AR application in response to determining that the usage of the external AR application transgresses the usage budget for the external AR application.

14. The user system of claim 1, wherein the operations further comprise:

launching the external AR application by the native AR application; and monitoring usage of the external AR application by the native AR application.

15. The user system of claim 14, wherein the operations further comprise:

receiving, by the native AR application, a message from the external AR application associated with the user, the message specifying a time interval during which the usage of the external AR application will transgress the usage budget.

16. The user system of claim 15, wherein the operations comprise:

delaying adjusting of one or more operations of the external AR application without modifying operation of the native AR application based on the message.

17. The user system of claim 16, wherein the operations comprise:

initiating a timer in response to determining that the usage of the external AR application transgresses the usage budget for the external AR application; and delaying the adjusting of the one or more operations of the external AR application without modifying operation of the native AR application while the timer fails to transgress the time interval.

18. The user system of claim 17, wherein the operations comprise:

adjusting of the one or more operations of the external AR application without modifying operation of the native AR application in response to determining that the timer transgresses the time interval and in response to determining that the usage of the external AR application continues to transgress the usage budget.

19. A non-transitory computer-readable storage medium including instructions that, when processed by a user system, configure the user system to perform operations comprising:

launching a native augmented reality (AR) application together with an external AR application on the user system;

determining that usage of the external AR application transgresses a usage budget for the external AR application; and in response to determining that the usage of the external AR application transgresses the usage budget for the external AR application, reducing a frame rate associated with a first user interface (UI) of the external AR application without modifying the frame rate associated with presentation of a second UI of the native AR application.

20. A method performed on a user system, the method comprising:

launching a native augmented reality (AR) application together with an external AR application on the user system;

determining that usage of the external AR application transgresses a usage budget for the external AR application; and in response to determining that the usage of the external AR application transgresses the usage budget for the external AR application, reducing a frame rate associated with a first user interface (UI) of the external AR application without modifying the frame rate associated with presentation of a second UI of the native AR application.

* * * * *